US012799567B2

(12) United States Patent
Haertel

(10) Patent No.: US 12,799,567 B2
(45) Date of Patent: Nov. 17, 2026

(54) HIGH-STRENGTH ALUMINIUM ALLOYS FOR STRUCTURAL APPLICATIONS, WHICH ARE PROCESSABLE BY ADDITIVE MANUFACTURING

(71) Applicant: AM Metals GmbH, Halsbruecke (DE)

(72) Inventor: Michael Haertel, Freiberg (DE)

(73) Assignee: AM Metals GmbH, Halsbruecke (DE)

(*) Notice: Subject to any disclaimer, the term of this patent is extended or adjusted under 35 U.S.C. 154(b) by 487 days.

(21) Appl. No.: 17/915,651

(22) PCT Filed: Mar. 30, 2021

(86) PCT No.: PCT/EP2021/058253
§ 371 (c)(1),
(2) Date: Sep. 29, 2022

(87) PCT Pub. No.: WO2021/198231
PCT Pub. Date: Oct. 7, 2021

(65) Prior Publication Data

US 2023/0135943 A1 May 4, 2023

(30) Foreign Application Priority Data

Mar. 30, 2020 (DE) ......................... 102020108781.0

(51) Int. Cl.
*C22C 21/12* (2006.01)
*B22F 1/05* (2022.01)
(Continued)

(52) U.S. Cl.
CPC ................ *C22C 21/12* (2013.01); *B22F 1/05* (2022.01); *B22F 9/082* (2013.01); *B22F 10/28* (2021.01);
(Continued)

(58) Field of Classification Search
CPC ...................................................... C22C 21/12
See application file for complete search history.

(56) References Cited

U.S. PATENT DOCUMENTS

| | | | |
|---|---|---|---|
| 5,211,910 A | 5/1993 | Pickens et al. | |
| 2010/0143185 A1* | 6/2010 | Pandey | C22C 21/00 420/528 |

(Continued)

FOREIGN PATENT DOCUMENTS

| | | |
|---|---|---|
| CN | 106676342 | 6/2018 |
| CN | 110144502 | 8/2019 |

(Continued)

OTHER PUBLICATIONS

"Spherical Aluminum Alloy Powder Grade: AM-205 QC-089, Rev. F, Jul. 21, 2016 Physical I\Nalysis Specified Limit Nominal Value," Jul. 21, 2016 {Jul. 21, 2016), pp. 1-1, Retrieved from the Internet: nttps://addilivemanufacturingllc.com/wp-conlenl/uploads/2015/04/Dala-Sheet-AM-205.pdf (Year: 2016).*

(Continued)

*Primary Examiner* — Jophy S. Koshy
*Assistant Examiner* — Joshua S Carpenter
(74) *Attorney, Agent, or Firm* — Polsinelli PC

(57) ABSTRACT

Disclosed are pulverulent aluminium alloys having Cu, Zn or Si/Mg as the most relevant alloying element, the alloy further having a content of 1 to 15 wt. % of metals selected from the group M1 comprising Mo, Nb, Zr, Fe, Ti, Ta, V, and lanthanides. Such aluminium alloys can be used in additive manufacturing processes such as selective laser melting for the production of high-strength and hot-crack-free three-dimensional objects. Further disclosed are methods and devices for producing three-dimensional objects from such aluminium alloys, methods for producing such pulverulent aluminium alloys, three-dimensional objects also produced
(Continued)

from such pulverulent aluminium alloys, and specific aluminium alloys.

6 Claims, 2 Drawing Sheets

(51) Int. Cl.

| | |
|---|---|
| ***B22F 9/08*** | (2006.01) |
| ***B22F 10/28*** | (2021.01) |
| ***B22F 10/64*** | (2021.01) |
| ***B33Y 70/00*** | (2020.01) |
| ***C22C 21/16*** | (2006.01) |
| *B33Y 10/00* | (2015.01) |
| *B33Y 30/00* | (2015.01) |
| *B33Y 40/10* | (2020.01) |

(52) U.S. Cl.

CPC .............. *B22F 10/64* (2021.01); *C22C 21/16* (2013.01); *B22F 2203/11* (2013.01); *B22F 2301/052* (2013.01); *B22F 2304/058* (2013.01); *B22F 2304/10* (2013.01); *B33Y 10/00* (2014.12); *B33Y 30/00* (2014.12); *B33Y 40/10* (2020.01); *B33Y 70/00* (2014.12)

(56) References Cited

U.S. PATENT DOCUMENTS

| | | | | |
|---|---|---|---|---|
| 2013/0068411 | A1* | 3/2013 | Forde | C22C 21/14 420/533 |
| 2017/0292174 | A1 | 10/2017 | Karabin et al. | |
| 2019/0193158 | A1 | 6/2019 | Wilhelmy et al. | |
| 2020/0156154 | A1* | 5/2020 | Chehab | C22C 21/16 |

FOREIGN PATENT DOCUMENTS

| | | | | |
|---|---|---|---|---|
| CN | 110144502 A | * 8/2019 | | B22F 9/082 |
| DE | 102005024790 | 12/2006 | | |
| FR | 3065178 A1 | * 10/2018 | | B23K 35/0261 |
| JP | 2017066432 A | 4/2017 | | |
| JP | 2019532176 A | 11/2019 | | |
| WO | 2016142631 | 9/2016 | | |
| WO | 2018189458 | 10/2018 | | |

OTHER PUBLICATIONS

English machine translation of CN 110144502 A of Li (Year: 2019).*

"Mesh to Micron Chart: Micron Size." Elcan Industries, Mar. 15, 2024, elcanindustries.com/blog_posts/mesh-to-micron-chart/. (Year: 2024).*

PCT Search Report for Application No. PCT/EP2021/058253, dated Jun. 10, 2021, 7 pages.

German Search Report for Application No. DE102020108781.0, dated Nov. 13, 2020, 2 pages.

Gu Huaiyuan et al. "Fracture of three-dimensional lattices manufactured by selective laser melting," International Journal of Solids and Structures, New York, NY, US, vol. 180, Jul. 29, 2019 (Jul. 29, 2019), pp. 147-159, [retrieved on Jul. 29, 2019], DOI: 10.1016/J.HSOLSTR.2019.07.020, ISSN: 0020-7683, XP085760539, 13 pages.

Denti Lucia. "Additive Manufactured A357.0 Samples Using the Laser Powder Bed Fusion Technique: Shear and Tensile Performance," Metals, vol. 8, No. 9, Aug. 27, 2018 (Aug. 27, 2018), p. 670 DOI: 10.3390/met8090670, XP055809362, 15 pages.

N/a. "A20X," Sep. 30, 2020 (Sep. 30, 2020), pp. 1-2, Retrieved from the Internet: https://a20x.com/wp-content/uploads/2020/09/A205_Data-Sheet_A20X_2020v5.pdf, [retrieved on May 31, 2021] XP055809357, 2 pages.

3t Additive Manufacturing. "Data Sheet Aluminium A20X(TM) (AM205)," Apr. 29, 2019 (Apr. 29, 2019), pp. 1-2, Retrieved from the Internet: https://www.3t-am.com/sites/threeT/files/Aluminium%20A20X_Datasheet.pdf, [retrieved on May 31, 2021] XP055809353, 1 page.

N/a. "Spherical Aluminum Alloy Powder Grade: AM-205 QC-089, Rev. F, Jul. 21, 2016 Physical Analysis Specified Limit Nominal Value," Jul. 21, 2016 (Jul. 21, 2016), pp. 1-1, Retrieved from the Internet: https://additivemanufacturingllc.com/wp-content/uploads/2015/04/Data-Sheet-AM-205.pdf, [retrieved on May 31, 2021] XP055809352, 1 page.

Xiao D.H. et al. "Effect of titanium additions on mechanical properties of Al—Cu—Mg—Ag alloy," Materials Science and Technology, GB, vol. 20, No. 9, Sep. 1, 2004 (Sep. 1, 2004), pp. 1199-1204, Retrieved from the Internet: https://www.tandfonline.com/doi/pdf/10.1179/026708304225022106?needAccess=true, DOI: 10.1179/026708304225022106, ISSN: 0267-0836, XP055809333, 7 pages.

Japanese Patent Application No. 2022-559311, Office Action dated Mar. 12, 2024.

Japanese Patent Application No. 2022-559311, English Translation of Office Action dated Mar. 12, 2024.

Chinese Patent Application No. 202180026945.9, Office Action dated Apr. 25, 2024.

* cited by examiner

HIGH-STRENGTH ALUMINIUM ALLOYS FOR STRUCTURAL APPLICATIONS, WHICH ARE PROCESSABLE BY ADDITIVE MANUFACTURING

TECHNICAL FIELD OF THE INVENTION

The invention relates to special pulverulent aluminium alloys with Cu, Zn or Si/Mg as the most relevant alloying element, which have a content of 1 to 15 wt. % of metals selected from the group M1 comprising Mo, Nb, Zr, Fe, Ti, Ta, V, and lanthanides. The invention further relates to methods for producing such aluminium alloys, methods and apparatuses for additive manufacturing of three-dimensional objects, as well as three-dimensional objects produced according to these methods and special aluminium alloys.

BACKGROUND OF THE INVENTION

Light metal components are the subject of intensive research in the manufacture of vehicles, especially automobiles, with the aim of continuously improving the performance and fuel efficiency of the vehicles. Many light metal components for automotive applications today are made of aluminium and/or magnesium alloys. Such light metals can form load-bearing components that need to be strong, rigid and have good strength and ductility (e.g. elongation). High strength and ductility are particularly important for safety requirements and robustness in vehicles, such as automobiles. While conventional steel and titanium alloys provide high temperature resistance, these alloys are either heavy or comparatively expensive, respectively.

A cost-effective alternative of light metal alloys for forming structural components in vehicles are aluminium-based alloys. Such alloys can be conventionally processed into the desired components by bulk forming processes such as extrusion, rolling, forging, stamping, or casting techniques such as die casting, sand casting, investment casting (investment casting), gravity die casting and the like.

High-strength aluminium alloys with sufficient plastic elongation to absorb energy are already known from the state of the art, mainly from the field of wrought alloys. Mainly materials from the aluminium 2000, 6000 and 7000 series are to be mentioned here. These materials are characterised by their comparatively soft ductile aggregate state, which makes shaping possible. With the help of the energy introduced by massive forming and subsequent heat treatment, the alloys are transformed into the high-strength and fully hardened state.

In recent years, “rapid prototyping” or “rapid tooling” has also gained importance in metal processing. These processes are also known as selective laser sintering and selective laser melting. In this process, a thin layer of a material in pulverulent form is repeatedly applied and the material is selectively solidified in each layer in the areas where the later product is located by exposure to a laser beam, in that the material is first melted at predetermined positions and then solidifies. In this way, a complete three-dimensional body can be built up successively.

A method for the production of three-dimensional objects by selective laser sintering or selective laser melting as well as an device for carrying out this method is disclosed, for example, in EP 1 762 122 A1.

For processing by selective laser sintering or laser melting, an alloy is required whose precipitation mechanism functions without prior cold forming. Such alloys are known in particular from the field of 2000 series alloys (i.e. aluminium-copper alloys). However, the relatively large melting interval poses a problem for these alloys, since hot cracks can occur in the structures as a result of the rapid solidification due to low-melting eutectics, which do not unaffectedly endure the shrinkage stresses during solidification of the structures. When processing by selective laser sintering, only micro-cracked structures are usually obtained, so that conventional, high-strength wrought aluminium alloys are are cannot yet be processed by additive manufacturing.

Other available aluminium alloys that are already established for processing using additive manufacturing techniques (such as those from the AlSi alloy family) do not have the desirable combination of properties of high yield strength and elongation at break, or are disadvantageous due to very cost-intensive and rare alloy elements.

An example of an aluminium alloy with rare alloying elements is described in e.g. EP 3 181 711 A1, in which the aluminium is alloyed with relatively large amounts of Sc (0.6 to 3 wt. %). In the alloys produced in this way, intermetallic Al—Sc phases have a strong strength-increasing effect, so that yield strengths of >400 MPa are achieved.

In addition to the relatively cost-intensive metal Sc, which is required for the alloy, it is, however, disadvantageous that the alloys described in EP 3 181 711 A1 are not suitable for application temperatures of >180° C., since the AlMg matrix tends to soften and creep.

Another approach for alloys for use in additive manufacturing are Al-MMC (MMC=Matrix Metal Composite) concepts, which at room temperature have mechanical properties comparable to AlMgSc alloys. The problem with these materials, however, is that they show a significant drop in strength at temperatures above 200° C. Another problem with the Al-MMC concepts is that the material consists of a powder mixture of three components, which makes transport, storage and reuse difficult, since a change in the mixing ratio due to the physical processes cannot be ruled out. Detrimental is furthermore the negative recycling behaviour of MMC metal-ceramic composites and the fact that the mechanical reworking of Al-MMC is more difficult and associated with higher costs.

Based on the state of the art described above, there is a need for an aluminium alloy that is as inexpensive as possible, is thermally stable and has high-strength properties, and can be processed into three-dimensional objects with high strengths and stiffnesses and favourable corrosion properties using additive manufacturing techniques such as selective laser sintering and selective laser melting. Rare earth metals that are in short supply on the market, such as scandium, should be avoided if possible in order to ensure a high degree of supply security. There is also a need for an additive processing method for the production of three-dimensional objects and high-strength three-dimensional objects produced by these methods.

This problem is solved by a pulverulent aluminium alloy, by a method for producing a three-dimensional object, by a method for producing the pulverulent aluminium alloy, by a three-dimensional object produced using a pulverulent aluminium alloy, by a device for carrying out a method for producing a three-dimensional object, and by an aluminium alloy.

SUMMARY OF THE INVENTION

The pulverulent aluminium alloy according to the invention is a powder for use in the manufacture of three-dimensional objects using additive manufacturing techniques. The pulverulent aluminium alloy according to the invention contains Cu, Zn or Si/Mg as the most relevant alloying element and further has a content of 1 to 15 wt. % of metals selected from the group M1 comprising Mo, Nb, Zr, Fe, Ti, Ta, V, and lanthanides. This aluminium alloy expediently contains no relevant portions of Cr or Li (i.e. in particular less than 0.3 wt. %, preferably less than 0.15 wt. % and even more preferably less than 0.1 wt. % total portion of Cr and/or Li, and most preferably no portions exceeding unavoidable impurities and Cr and/or Li). If the aluminium alloy contains Cr and/or Li, it should be heeded that the total content of metals of the group M1 plus Cr and Li should be in the specified range of 1 to 15 wt. %, or in corresponding more preferred ranges.

The indication "aluminium alloy" is to be understood in the context of this description as meaning that the alloy contains aluminium as the most essential metal element and that its portion in the aluminium alloy is more than 60 wt. %, preferably more than 70 wt. % and even more preferably more than 80 wt. %. The indication "Cu, Zn or Si/Mg as the most relevant alloying element" is to be understood as meaning that the portion of Cu, Zn or Si/Mg is greater than the respective portion of all other elements (with the exception of aluminium) in the alloy, where Si/Mg denotes the total content of Si and Mg in the alloy (in this case the sum of the portions of Si and Mg is greater than the respective portion of all other elements (with the exception of aluminium) in the alloy). The "most relevant alloying element" refers to the aluminium alloy as such, i.e. without taking into account the additional metals from the group M1 contained in the composition according to the invention, but it is preferred if the portion of Cu or Zn is greater than the respective portion of all other elements (with the exception of aluminium) in the alloy with inclusion of the metals from the group M1.

In this context, the person skilled in the art is aware that AlCu alloys (i.e. alloys in which Cu is the most relevant alloying element) are also referred to as aluminium alloys of the series 2000 series, AlZn alloys (i.e. alloys in which Zn is the most relevant alloying element) are also referred to as aluminium alloys of the series 7000 series and AlSi/Mg alloys (i.e. alloys in which "Si/Mg" is the most relevant alloying element) are also referred to as aluminium alloys of the series 6000 series (according to the International Alloy Designation System). For an overview of aluminium alloys falling under this category, reference can be made, for example, to en.wikipedia.org/wiki/Aluminium_alloy#Alloy_designations.

By the admixture of metals from the M1 group a production of essentially or even completely crack-free three-dimensional bodies by means of additive manufacturing techniques such as selective laser sintering or selective laser melting is enabled, although relatively large quantities of transition metals are added. This is surprising, as it is usually not possible to increase the alloy content of these transition metals above a defined limit (e.g. in the range of 0.1 to 0.3 wt. %) in conventional aluminium processing technologies, as such an increase leads to a strongly decreasing ductility and thus to a no longer given processability, which only allows the production of very coarse structural components. In the production of three-dimensional bodies and objects via additive manufacturing techniques described here, this problem is circumvented because the shaping does not require above-average ductility of the material, so that due to the process very fine and nanoscale structures can also be produced.

As a preferred portion for metals from the group M1 a portion of at least 1.3 wt. %, preferably 2.0 wt. % up to 8.0 wt. %, and further preferably 2.5 wt. % up to 5.0 wt. % can be given. Alternatively or in addition thereto, the metal or the metals selected from the group M1 does not consist of substantial portions of lanthanides, the obtainment of which can be cost-intensive, wherein the portion of lanthanides, relative to the total amount of metals from the group M1, is preferably less than 10 wt. %, further preferably less than 5 wt. %, and still further preferably less than 1 wt. %. Preferred metals from the group M1 are easily obtainable and inexpensive metals such as Zr, Fe, and Ti, wherein Zr and/or Ti may be indicated as particularly suitable. For Zr, a portion of 0.25 to 2 wt. % and in particular 0.5 to 1.9 wt. % can be indicated as particularly suitable. Similarly, for Ti, a portion of 0.25 to 2 wt. % and in particular 0.5 to 1.9 wt. % can be indicated as particularly suitable. It is particularly preferred if the aluminium alloy contains Zr and Ti as metals of the group M1 and these are present in the aluminium alloy in a portion of 0.25 to 2 wt. % in each case, and in particular 0.5 to 1.9 wt. %.

Preferably, the aluminium alloy according to the invention does not contain any relevant portions of Sc or Y, since these metals are associated with severe cost disadvantages. Preferred aluminium alloys according to the invention therefore contain a maximum of up to 1.5 wt. % of Sc and/or Y, preferably a maximum of up to 1 wt. %, even more preferably a maximum of up to 0.5 wt. % and even more preferably no amounts of Sc and Y exceeding usual impurities.

A particularly suitable pulverulent aluminium alloy in the context of this description is an aluminium alloy with a content of 4 to 6 wt. % Cu, 0.1 to 1.5 wt. % Mg and 0.1 to 1 wt. % Ag. For this alloy it is further preferred if, taking into account these elements and the elements from the group M1, the up to 98 wt. % missing portion of the alloy, preferably the up to 99 wt. % missing portion of the alloy, is accounted for by aluminium. In this case, the up to 100 wt. % missing portion of the alloy is usually provided by other metals and/or non-metals such as oxygen, which, however, no longer have any significant influence on the mechanical properties of the alloy.

In a particularly preferred embodiment, the aluminium alloy according to the invention described above has a content of at least 4.5 wt. % and/or at most 5.8 wt. %, preferably at least 4.8 wt. % and/or at most 5.5 wt. % Cu, at least 0.2 wt. % and/or at most 1.5 wt. %, preferably at least 0.3 wt. % and/or at most 1.2 wt. % Mg, and at least 0.05 wt. % and/or at most 0.6 wt. %, preferably at least 0.2 wt. % and/or at most 0.4 wt. % Ag. Alternatively or in addition thereto, the above-described aluminium alloy according to the invention preferably contains up to 0.2 wt. %, in particular 0.05 to 0.15 wt. % oxygen, up to 0.6 wt. %, and in particular 0.2 to 0.55 wt. % manganese and up to 0.3 wt. %, preferably 0.05 to 0.15 wt. % silicon.

In a further particularly preferred embodiment, the aluminium alloy according to the invention described above has a content of at least 0.2 wt. % and/or at most 1.3 wt. %, preferably at least 0.3 wt. % and/or at most 1.0 wt. % Si, at least 0.4 wt. % and/or at most 2.2 wt. %, preferably at least 0.6 wt. % and/or at most 1.8 wt. % Mg, and at least 0.3 wt. % and/or at most 1.3 wt. %, preferably at least 0.4 wt. % and/or at most 1.0 wt. % Mn. It is preferred for this aluminium alloy to have a total content of Si and Mg in the range from 0.9 to 2.8 wt. % and in particular in the range from 1.2 to 2.5 wt. %.

For the aluminium alloys described above, it was found that in products made from them by additive manufacturing, desired mechanical characteristics can be adjusted by heat treatment. Through the selection of the alloying elements, the electrochemical resting potential of the matrix can also be shifted towards more noble values compared to the precipitates, so that a higher corrosion resistance and a significantly reduced susceptibility of the alloys to stress cracking can be realised.

With regard to the particle size, the pulverulent aluminium alloys according to the invention are not subject to any significant restrictions, wherein the particle size should be in a dimension suitable for an additive process for the production of three-dimensional objects. As suitable particle size an average particle size d50 in the range from 0.1 to 500 μm, preferably at least 1 and/or at most 200 μm, and particularly preferably at least 10 and/or at most 80 μm can be given. Very particularly preferred is a mean particle size d50 in the range of from 10 to 80 μm.

As indicated further below, the pulverulent aluminium alloy according to the invention may also be in the form of a wire, e.g. for certain processing operations, so that a corresponding wire-shaped aluminium alloy is also a subject matter of the invention.

d50 denotes the size at which the amount of particles by weight having a diameter smaller than the specified size is 50% of the mass of a sample. Conventionally, as well as in the context of the invention described herein, the particle size distribution is determined by laser scattering or laser diffraction, e.g. according to ISO 13320:2009. The diameter of a single particle may be a respective maximum diameter (=supremum of all distances per two points of the particle) or a sieve diameter or a volumetric equivalent sphere diameter, as the case may be.

As mentioned above, by the inclusion of elements from the group M1, the tendency of the material to form stress cracks can be significantly reduced, ideally stress cracks are completely avoided. For this purpose, inclusion of ceramic materials described for similar purposes is not necessary. Accordingly, the pulverulent aluminium alloy according to the invention contains as far as possible no added ceramic compounds, such as in particular metal borides, metal nitrides and metal carbides. The portion of such materials in the aluminium alloy is accordingly expediently to be limited to less than 0.2 wt. %, in particular less than 0.1 wt. % and further preferably less than 0.05 wt. %. Also nanoparticulate metals or metal hydrides (e.g. Zr, Hf or $ZrH_2$, with particle sizes up to 5 μm), which have been described elsewhere in the prior art for avoiding stress cracking, are not necessary for this purpose in the pulverulent aluminium alloys according to the invention, so that their portion should be within the limits indicated for metal borides, metal nitrides and metal carbides or ceramic additives. It is particularly advantageous if no corresponding materials are added to the pulverulent aluminium alloy according to the invention for or during its processing.

The pulverulent aluminium alloys according to the invention can be produced by any process known to the person skilled in the art for the production of pulverulent alloys. A particularly useful process includes, e.g., an atomisation of the liquid aluminium alloy or a mechanical alloying. Accordingly, in a further aspect, the present invention relates to a process for producing a pulverulent aluminium alloy comprising a step of atomising the liquid alloy at a temperature of >850° C., preferably of >950° C. and more preferably of >1050° C. Temperatures higher than 1200° C. are not necessary for atomisation and are less advisable due to the higher energy requirements. Therefore, a range of >850 to 1200° C. and preferably >950 to 1150° C. can be specified as a particularly favourable temperature range for the atomisation. It must be ensured by sufficient overheating of the melt or process control that the above-mentioned temperatures also prevail constantly at the nozzle in order to prevent undesired primary precipitations. A production of pulverulent aluminium alloys by atomisation is connected with the advantage that the additive metals of group M1 are dissolved in the aluminium alloy or are present as metastable phases. During subsequent processing by laser sintering or laser melting, these phases are dissolved so that the metals can have a grain-refining effect.

Alternatively, the pulverulent aluminium alloy according to the invention can also be produced by mechanical alloying. In this process, metal powders of the individual components of the later alloy (or premixtures thereof) are intensively mechanically treated and homogenised down to the atomic level. For a modification of the particles it is possible to post-process the obtained particles after mechanical alloying, in order to for example change the morphology, particle size or particle size distribution or to carry out a surface treatment. The post-processing can comprise one or more steps selected from chemical modification of the particles and/or the particle surface, sieving, crushing, round grinding, plasma spheronisation (i.e. processing into round particles) and additive treatment. Here particularly modifications of the particle morphology or grain size distribution are advisable, as with mechanical alloying usually plates or flakes are obtained. This form is generally problematic in a later additive processing method.

Furthermore, the present invention relates to a pulverulent aluminium alloy which is obtainable by the described method by atomisation of the liquid alloy at a temperature of preferably >850° C. and further preferably >1050° C., or by mechanical alloying with optional post-processing, whereby reference is also made to the above explanations for preferred embodiments of the atomisation, mechanical alloying and optional post-processing.

Also disclosed below is a pulverulent aluminium alloy for use in the production of three-dimensional objects with the aid of additive manufacturing techniques, which, in addition to aluminium, contains Cu, Zn or Si/Mg as the most relevant alloying element and furthermore has a content of 1 to 15 wt. % of metals selected from the group M1 comprising Mo, Nb, Cr, Zr, Fe, Ti, Ta, V, lanthanides and Li. The preferred embodiments disclosed above for the aluminium alloy according to the invention are analogously considered preferred for this pulverulent aluminium alloy.

Another aspect of the present invention relates to a method for producing a three-dimensional object by means of an additive manufacturing process (i.e. a process in which an object is built up layer by layer). The object is preferably produced by applying a build-up material layer by layer and selectively solidifying the build-up material, in particular by supplying radiation energy, at locations in each layer which are associated with the cross-section of the object in that layer, preferably by scanning the locations with at least one exposure area, in particular a radiation exposure area of an energy beam, or by introducing the build-up material into the radiation impact region and melting it and applying it to a substrate. In the context of the invention described herein, the build-up material comprises a pulverulent aluminium alloy as described above, but may alternatively comprise a corresponding wire-shaped aluminium alloy. Preferably, the build-up material comprises said pulverulent or wire-shaped aluminium alloy.

The three-dimensional object may be an object made of one material (i.e. the aluminium alloy) or an object made of different materials. If the three-dimensional object is an object made of different materials, this object can be produced, for example, by applying the aluminium alloy of the invention to a base body of the other material.

In the context of this method, it may be useful if the pulverulent aluminium alloy is preheated prior to the selective solidification, whereby a preheating to a temperature of at least 110° C. can be given as preferred, preheating to a temperature of at least 120° C. as further preferred, a preheating to a temperature of at least 130° C. as still further preferred, a preheating to a temperature of at least 150° C. as still further preferred, a preheating to a temperature of at least 165° C. as still further preferred and a preheating to a temperature of at least 190° C. as still further preferred. On the other hand, preheating to very high temperatures places considerable demands on the device for producing the three-dimensional objects, i.e. at least on the container in which the three-dimensional object is formed, so that a temperature of at most 400° C. can be specified as a reasonable maximum temperature for preheating.

Preferably, the maximum temperature for preheating is at most 350° C. and further preferably at most 300° C. The temperatures indicated for preheating respectively denote the temperature to which the building platform, onto which the pulverulent aluminium alloy is applied, and the powder bed formed by the pulverulent aluminium alloy are heated.

The application or deposition layer upon layer is expediently carried out in a layer thickness suitable for processing by means of additive manufacturing, e.g. with a layer thickness in the range of 20 to 60 μm, preferably with a thickness of at least 25 and/or at most 50 μm and further preferably with a thickness of at least 30 and/or at most 40 μm.

As indicated above, the method according to the invention may also be configured such that the build-up material is introduced into the radiation exposure area of an energy source, e.g. a laser, and is melted and applied to a substrate. In such a method, which is also referred to as laser cladding in the mode of powder build-up welding, a powder is spot-sprayed onto a substrate via one or more nozzles, and a laser is simultaneously aligned with the application point of the laser. By the radiation energy the substrate is partially melted and the applied alloy powder melted, so that the applied alloy can bond with the melted substrate. In this way, a layer of the particulate material is applied to the workpiece and bonded to a surface layer of the workpiece. By sequentially "spraying" molten layers of particulate material, a larger workpiece can thus be produced.

Alternatively, a laser coating process can also be carried out in the mode of a wire build-up welding process, wherein a wire is used instead of a powder. Accordingly, the method according to the invention also comprises an embodiment in which a wire made of an aluminium alloy, as indicated above, is used For the method according to the invention, it was additionally found that a heat treatment of the produced three-dimensional object can significantly improve its physical properties, e.g. in particular the tensile strength and/or the yield strength. Possibly, this effect is due to rearrangements in the microstructure in the alloy of the initially formed three-dimensional object. To this end, the method according to the invention therefore preferably further comprises a step of subjecting the initially formed three-dimensional object to a heat treatment, preferably at a temperature of from 400° C. to 500° C. and/or for a time of from 20 to 200 min. As a particularly preferred temperature range, a range of from 420° C. to 470° C. and in particular at least 430° C. and/or 450° C. or less may be mentioned. Particularly preferred time frames for the heat treatment are 30 min to 120 min and in particular at least 40 min and/or 80 min or less. In addition, it has been found that such a heat treatment provides particularly advantageous results if, after such a heat treatment at a comparatively high temperature, the three-dimensional object is rapidly cooled to about ambient temperature (i.e. in 10 min or less and preferably 5 min or less, e.g. by quenching with water) and is subsequently aged at a temperature of from 90° C. to 150° C., in particular at least 110° C. and/or at 140° C. or less, for at least 12 hours and preferably at least 18 hours.

Another aspect of the present invention relates to a three-dimensional object produced using a pulverulent aluminium alloy, which is in particular produced according to the method described above, wherein the pulverulent aluminium alloy is an aluminium alloy as described above and wherein the three-dimensional object comprises or consists of such an aluminium alloy. By using the above mentioned alloys for the production of such objects, very good "as built" surfaces are obtainable, so that subsequent post-treatments of the surface (e.g. smoothing) can be minimised.

The three-dimensional object according to the invention expediently has advantageously adapted mechanical properties, such as in particular a yield strength of at least 400 MPa and/or at most 550 MPa, preferably at least 440 MPa to 550 MPa and particularly preferably in the range of 460 to 480 MPa and/or a tensile strength of 450 MPa and/or at most 550 MPa, preferably at least 470 MPa and particularly preferably in the range of 500 to 550 MPa. These respective yield strengths and strengths are to be determined in accordance with EN ISO 6892.1 (2011) within the scope of the invention described herein. Alternatively or additionally, a three-dimensional object according to the invention preferably has a yield strength at 200° C. of preferably at least 330 MPa, more preferably at least 350 MPa and even more preferably in the range of 360 MPa to 420 MPa.

Another aspect of the present invention relates to a manufacturing device for carrying out a method for manufacturing of a three-dimensional object, as indicated above, wherein the device comprises a laser sintering or laser melting device, a process chamber configured as an open container having a container wall, a support located in the process chamber, wherein the process chamber and the support are movable relative to each other in the vertical direction, a storage container and a coater movable in the horizontal direction, and wherein the storage container is at least partially filled with a pulverulent aluminium alloy as mentioned above.

Similarly, the present invention relates to a manufacturing device for carrying out a method for manufacturing a three-dimensional object, comprising a device for laser coating and a process chamber, a feed device for feeding particulate material or wire into the exposure area of the laser beam, and a storage container at least partially filled with a pulverulent aluminium alloy as mentioned above or with wire of such an aluminium alloy.

Additive manufacturing devices for the production of three-dimensional objects and associated methods are generally characterised by the fact that objects are produced in them layer by layer by solidification of a shapeless (or wire-shaped) build-up material. The solidification can be brought about, for example, by supplying thermal energy to the build-up material by irradiating it with electromagnetic radiation or particle radiation, for example in laser sintering ("SLS" or "DMLS") or laser melting or electron beam melting.

For example, in laser sintering or laser melting, the exposure area of a laser beam ("laser spot") on a layer of the build-up material is moved over those points of the layer which correspond to the object cross-section of the object to be produced in this layer. Instead of the application of energy, the selective solidification of the applied build-up material can also be performed by 3D printing, for example by applying an adhesive or binder. In general, the invention relates to the manufacture of an object by means of layer-by-layer application and selective solidification of a build-up material, irrespective of the manner in which the build-up material is solidified.

Other features and embodiments of the invention will be found in the description of an exemplary embodiment with the aid of the accompanying drawings.

DETAILED DESCRIPTION OF THE EMBODIMENTS

Figure 1:
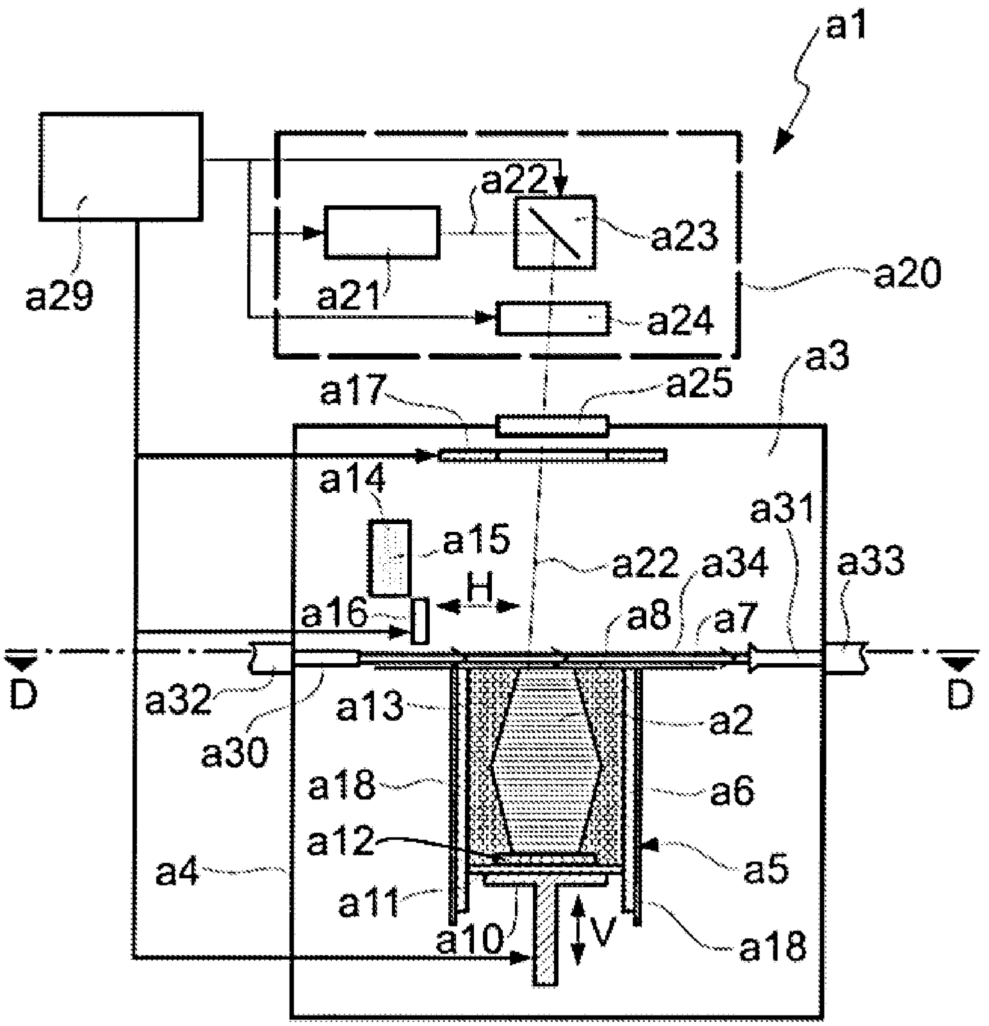
FIG. 1 shows a schematic illustration, partially reproduced as a cross-section, of a device for the layer-by-layer build-up of a three-dimensional object according to one embodiment of the present invention.

The device shown in FIG. 1 is a laser sintering or laser melting device a1 known per se. For the build-up of an object a2 it contains a process chamber a3 with a chamber wall a4. In the process chamber a3, an upwardly open building container a5 with a wall a6 is arranged. A working plane a7 is defined by the upper opening of the building container a5, whereby the area of the working plane a7 lying within the opening, which can be used to build up the object a2, is referred to as the building area a8. In the container a5 a support a10 movable in a vertical direction V is arranged, to which a base plate all is attached, which closes the building container a5 at the bottom and thus forms its base. The base plate all can be a plate formed separately from the support a10 which is attached to the support a10, or it can be formed integrally with the support a10. Depending on the powder and process used, on the base plate all also a building platform a12 on which the object a2 is built may be attached. However, the object a2 can also be built on the base plate all itself, which then serves as a building platform. In FIG. 1, the object a2 to be formed in the building container a5 on the building platform a12 is shown below the working plane a7 in an intermediate state with several solidified layers surrounded by build-up material a13 that has remained unsolidified. The laser sintering device a1 further contains a storage container a14 for a build-up material a15 in powder form which can be solidified by electromagnetic radiation and a coater a16 which can be moved in a horizontal direction H for applying the build-up material a15 to the building area a8. The laser sintering device a1 further contains an exposure device a20 with a laser a21 which generates a laser beam a22 as an energy beam which is deflected via a deflection device a23 and focused onto the working plane a7 by a focusing device a24 via a coupling window a25 which is mounted on the upper side of the process chamber a3 in its wall a4.

Further, the laser sintering device a1 includes a control unit a29 via which the individual components of the device a1 are controlled in a coordinated manner to perform the building process. The control unit a29 may include a CPU whose operation is controlled by a computer program (software). The computer program may be stored separately from the device on a storage medium from which it can be loaded into the device, in particular into the control unit. In operation, to apply a powder layer, the support a10 is first lowered by a height corresponding to the desired layer thickness. By moving the coater a16 over the working plane a7, a layer of the pulverulent build-up material a15 is then applied. To be on the safe side, the coater a16 pushes a slightly larger amount of build-up material a15 in front of it than is required to build up the layer. The coater a16 pushes the planned excess of build-up material a15 into an overflow container a18. An overflow container a18 is arranged on each side of the building container a5. The application of the pulverulent build-up material a15 happens at least over the entire cross-section of the object a2 to be produced, preferably over the entire building area a8, i.e. the area of the working plane a7, which can be lowered by a vertical movement of the support a10. Subsequently, the cross-section of the object a2 to be produced is scanned by the laser beam a22 with a beam exposure area (not shown), which schematically represents an intersection of the energy beam with the working plane a7. By this the pulverulent build-up material a15 is solidified at points corresponding to the cross-section of the object a2 to be produced. These steps are repeated until the object a2 is completed and can be removed from the building container a5. For generating a preferably laminar process gas flow a34 in the process chamber a3, the laser sintering device a1 further comprises a gas supply channel a32, a gas inlet nozzle a30, a gas outlet opening a31 and a gas discharge channel a33. The process gas flow a34 moves horizontally across the building area a8. The gas supply and discharge may also be controlled by the control unit a29 (not shown). The gas extracted from the process chamber a3 can be fed to a filter device (not shown), and the filtered gas can be fed back to the process chamber a3 via the gas supply channel a32, whereby a recirculation system with a closed gas circuit is formed. Instead of only one gas inlet nozzle a30 and one gas outlet opening a31, several nozzles or openings can be provided in each case.

In the device according to the invention, the reservoir a14 is at least partially filled with a pulverulent aluminium alloy a15, as indicated above.

Finally, another aspect of the present invention relates to an aluminium alloy with a content of 4 to 6 wt. % Cu, 0.1 to 1.5 wt. % Mg and 0.1 to 1 wt. % Ag, as well as 1.3 to 15 wt. % of metals selected from the group M1 comprising Mo, Nb, Zr, Fe, Ti, Ta, V, and lanthanides, wherein preferably the up to 99 wt. % missing portion of the alloy is accounted for by aluminium and wherein further preferably the up to 100 wt. % missing portion of the alloy is accounted for by aluminium, manganese, silicon and oxygen.

The present invention is further illustrated by a number of examples which should not, however, be construed as in any way determining the scope of protection of the present application.

Example 1

Various aluminium alloys with the compositions given in table 1 were processed into test bodies by means of direct metal laser sintering (DMLS). The test bodies produced in this way were examined with regard to their hardness, yield strength at 23° C. and tensile strength. The results of these tests are also given in Table 1.

| | comparison sample 1 | comparison sample 2 | sample 1 (invention) |
|---|---|---|---|
| composition | | | |
| Al | remainder to 100% | remainder to 100% | remainder to 100% |
| Cu | 4.8 | 5.0 | 5.2 |
| Ag | 0.4 | 0.39 | 0.33 |
| Mg | 0.4 | 0.4 | 0.81 |
| Zn | 0.11 | 0.01 | |
| Si | 0.13 | 0.07 | 0.09 |
| Mn | 0.4 | 0.4 | 0.48 |
| O | 0.046 | 0.019 | 0.14 |
| Zr | | 0.13 | 1.8 |
| Ti | | 0.24 | 1.0 |
| rest | <0.05 | <0.05 | <0.05 |
| properties | | | |
| hardness[1] | 80 HB | 120-125 HB | 130-145/170 HB[2] |
| yield strength (Rp 0.2) | | ~250 MPa | 480 MPa/510 MPa[2] |
| tensile strength (Rm) | | ~400 MPa | 550 MPa/525 MPa[2] |

[1]= as prepared;
[2]= after heat treatment.

To determine the hardness, the manufactured test body was subjected to the Brinell method according to the standard DIN EN ISO 6506-1:2015 “Metallic Werkstoffe—Härteprüfung nach Brinell—Teil 1: Prüfverfahren”. Density cube samples were used for the determination. The tests are performed three times for each sample and the measured values are given with an accuracy of 1 HBW.

The test body produced in comparison sample 1 showed massive hot cracks. In comparative sample 2, the hot cracks were considerably reduced compared to comparative sample 1, but still visible; a heat treatment of the test body did not lead to an improvement of the hardness of the material. The material according to the invention showed no hot cracks and considerably improved mechanical properties compared to the comparison samples already directly after production. By heat treatment (485° C./40 min and subsequent quenching with water and ageing at 25° C.) these properties could be improved considerably.

Example 2

A test body (-•-) made of the aluminium alloy according to example 1 was compared with corresponding test bodies made of other materials with regard to its yield strength properties. As comparative materials test bodies made of Scalmalloy (DMLS processed, -◇-), aluminium alloy AW2618 (forged, T6, -□-), aluminium alloy 7075 (T6, -▲-), aluminium alloy 2024 (T6, -x-) and Addmalloy (DMLS processed, -○-) were used. The data of the comparison materials are taken from the literature or corresponding data sheets. The yield strengths of test specimens made of these materials are shown in FIG. 2.

Figure 2:
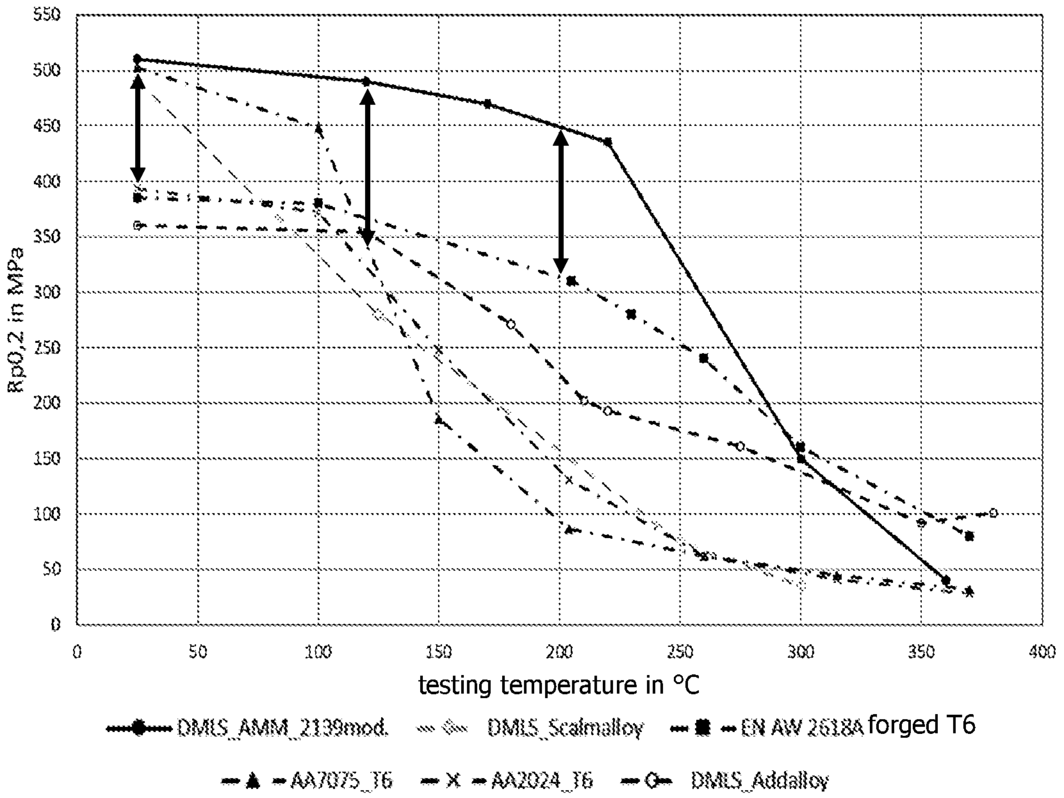
FIG. 2 illustrates a plot of the yield strengths of test specimens according to Example 2.

From FIG. 2 it becomes apparent that the aluminium alloy according to the invention had the highest yield strength of all tested materials already at 23° C., whereas only Scalmalloy and the aluminium alloy 7075 had a yield strength in a similarly high range. Compared to the high temperature wrought alloy AW-2618A, the difference was about 27%. Above a temperature of about 100 to 120° C., the yield strength of the aluminium alloy 7075 drops sharply, that of Scalmalloy is even significantly lower at these temperatures. In contrast, the yield strength of the aluminium alloy of the invention decreases only slightly at these temperatures. At about 200° C., the aluminium alloy according to the invention has a yield strength that is about 42% better than the second-best alloy AW 2618A.

The invention claimed is:

1. A pulverulent aluminum alloy comprising:
4.8 to 5.5 wt. % Cu;
greater than 0.8 wt. % to 1.2 wt. % Mg;
0.2 to 0.4 wt. % Ag;
up to 0.2 wt. % O;
0.2 to 0.55 wt. % Mn;
up to 0.15 wt. % Si;
0.5 to 1.9 wt. % Zr;
0.5 to 1.9 wt. % Ti;
a content of 1 to 15 wt. % of metals selected from the group M1 that consists of Mo, Nb, Zr, Fe, Ti, Ta, V, and lanthanides; and
a balance of aluminum and unavoidable impurities,
wherein a total content of Zr+Ti is at least 2.5 wt. %.

2. The pulverulent aluminum alloy according to claim 1, wherein the alloy has a mean particle size d50 in a range from 10 to 80 μm.

3. The pulverulent aluminum alloy according to claim 1, wherein the total content of Zr+Ti is from 2.5 wt. % to 2.9 wt. %.

4. The pulverulent aluminum alloy according to claim 1, wherein a content of metal borides, metal nitrides, and metal carbides is present in an amount less than 0.2 wt. %.

5. The pulverulent aluminum alloy according to claim 1, wherein the O is present in an amount of 0.05 to 0.15 wt. %.

6. The pulverulent aluminum alloy according to claim 1, wherein the Si is present in an amount of 0.05 to 0.15 wt. %.

* * * * *